United States Patent [19]

Stöhr et al.

[11] 4,227,043
[45] Oct. 7, 1980

[54] SEALING DEVICE FOR PORTIONS OF ELECTRIC CABLES IN THE HOLES OF HOUSINGS OF ELECTRIC MOTORS OR THE LIKE

[75] Inventors: Heinz Stöhr; Gerhard Kuntz, both of Bad Homburg; Gerhard Scheer, Namborn, all of Fed. Rep. of Germany

[73] Assignee: Klein, Schanzlin & Becker Aktiengesellschaft, Frankenthal, Fed. Rep. of Germany

[21] Appl. No.: 918,163

[22] Filed: Jun. 22, 1978

[30] Foreign Application Priority Data

Jul. 7, 1977 [DE] Fed. Rep. of Germany ....... 2730675

[51] Int. Cl.² .................... H02G 3/22; H01B 17/30
[52] U.S. Cl. .................................. 174/151; 174/65 SS
[58] Field of Search ............... 174/18, 65 R, 65 SS, 174/77 R, 151, 152 R, 153 R; 310/71, 87; 339/94 R, 126 R

[56] References Cited

U.S. PATENT DOCUMENTS

| 2,924,644 | 2/1960 | Cox | 174/153 R X |
| 3,033,919 | 5/1962 | Aschinger | 174/151 |
| 3,043,903 | 7/1962 | Keane et al. | 174/152 R |
| 3,084,210 | 4/1963 | Bluth et al. | 174/151 X |
| 3,104,277 | 9/1963 | Bossu | 174/77 R X |

FOREIGN PATENT DOCUMENTS 916224 1/1963 United Kingdom ................ 174/65 SS Primary Examiner—Laramie E. Askin
Attorney, Agent, or Firm—Peter K. Kontler

[57] ABSTRACT

That part of the sheath of an electric cable which extends through a hole in the housing of a submersible pump motor is surrounded by a metallic sleeve having end portions of reduced diameter. Such end portions and the adjacent portions of the sheath are surrounded by and bonded to tubular insulators whose maximum outer diameter does not exceed the maximum outer diameter of the sleeve. The insulators may consist of convoluted strip-shaped material or foil which is bonded to the adjacent portions of the sleeve and sheath. The clearance between the median portion of the sleeve and the surface surrounding the hole is sealed by one or more O-rings or by a bolt which is threadedly connected to the housing and surrounds the sleeve, a nut which surrounds the sleeve and meshes with the bolt, and a deformable ring seal which is interposed between the sleeve on the one hand and the bolt and nut on the other hand to be deformed by the nut when the latter is rotated in a direction to receive a larger portion of the bolt.

10 Claims, 2 Drawing Figures

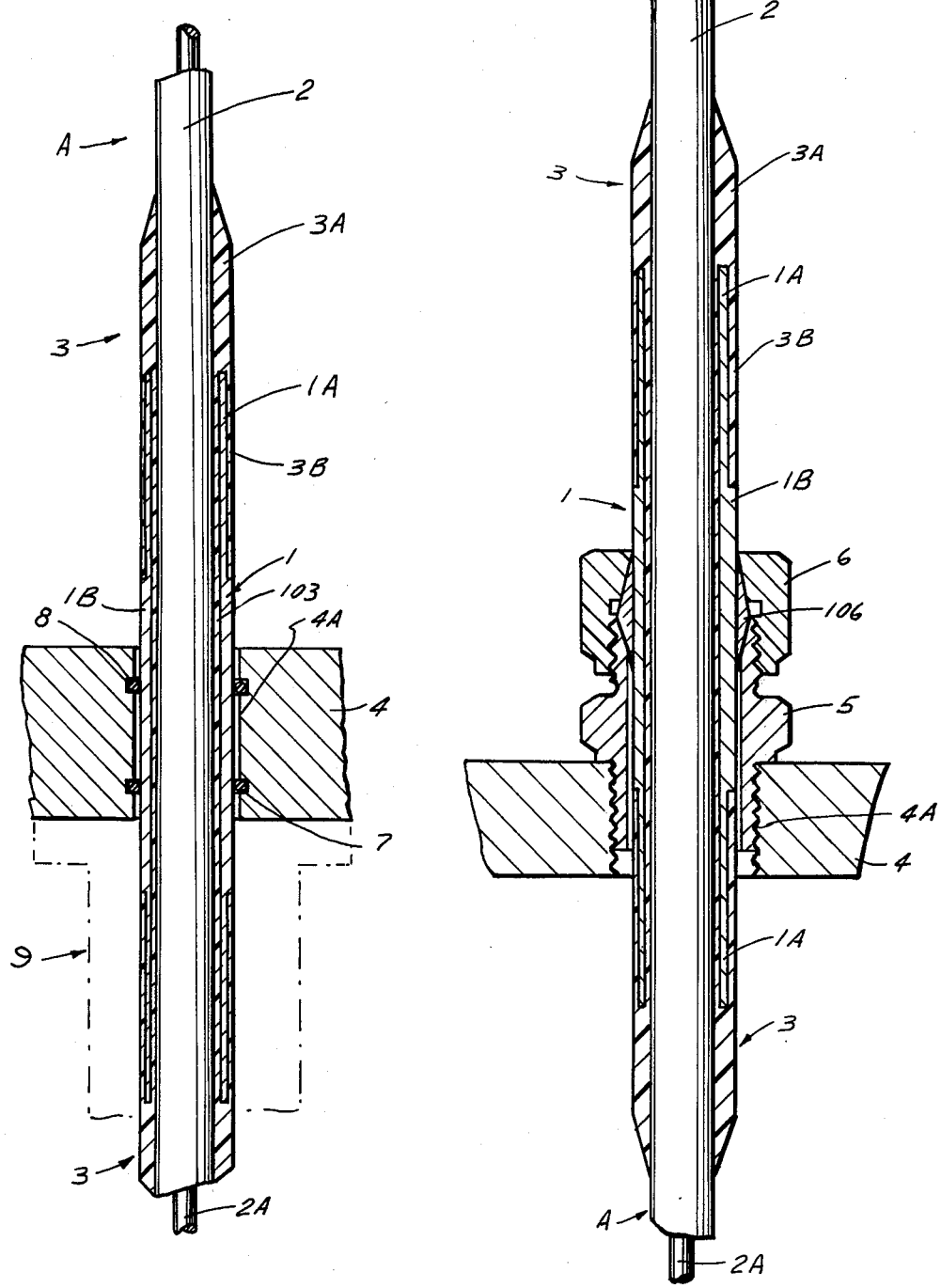

SEALING DEVICE FOR PORTIONS OF ELECTRIC CABLES IN THE HOLES OF HOUSINGS OF ELECTRIC MOTORS OR THE LIKE

BACKGROUND OF THE INVENTION

The present invention relates to devices for guiding, sealing and protecting those portions of electric cables which extend through holes in walls or the like, especially to devices for guiding electric cables which connect submersible pump motors with a source of electrical energy.

The housing of a submersible motor often contains oil or another fluid which should be sealed from the area around the housing. Therefore, the hole through which the electric cable for connection of the motor to an energy source extends must be sealed to prevent the flow of fluid media into or from the housing. Heretofore known sealing devices include stuffing boxes and deformable sealing elements in the form of rings, e.g., chambered vulcanized beads which are mechanically stressed to remain in sealing engagement with the cable as well as with the surface surrounding the hole through which the cable extends. It has been found that neither a stuffing box nor a sealing ring can furnish a long-lasting sealing action, primarily due to aging of the sealing material as well as a result of creep of the material of the sheaths of electric cables (such sheaths normally or often consist of elastomeric material). Thus, the mechanical force which is applied to the gland of a stuffing box or to a sealing ring suffices for a relatively short period of time but the hole for the cable begins to allow fluid to leak therethrough as soon as the material of the stuffing box, sealing ring and/or cable begins to exhibit signs of wear, aging, creep and/or cracking. The likelihood of rapid deterioration of the seals is much higher if the temperature of fluid in the interior of or around the housing through which the cable extends is high or fluctuates within a rather wide range. The same holds true if the pressure in the housing greatly exceeds the pressure around the housing or vice versa.

Many presently known devices for the sealing of holes through which electric cables extend exhibit the additional drawback that they must be destroyed, either entirely or in part, before the cable can be withdrawn from the hole. As a rule, it is necessary to sever a vulcanized seal in order to allow for extraction of the cable which connects an energy source with the electrical components in the housing of a submersible motor or the like. Still further, the sealing of a hole (subsequent to introduction of a cable into the interior of a motor housing or the like) is a tedious and time-consuming operation.

OBJECTS AND SUMMARY OF THE INVENTION

An object of the invention is to provide a device which can adequately seal a hole for an electric cable for long periods of time.

Another object of the invention is to provide a device of the just outlined character whose sealing action is not affected by aging of the material of the cable sheath and which can be assembled or taken apart without any damage to its components.

A further object of the invention is to provide a device whose sealing action is not adversely influenced by changes of temperature and/or pressure.

An additional object of the invention is to provide a cable sealing device which can be taken apart and reassembled as often as desired without affecting its sealing and/or protecting action.

The invention is embodied in a sealing device for the sheath of an electric cable which extends through the hole of a housing, e.g., through the hole in the housing of a submersible pump motor which is filled with oil, water or another liquid that should not escape from the housing and should not mix with the fluid around the housing. The device comprises an elongated sleeve whose median or central portion extends through the hole and whose end portions have outer diameters smaller than the outer diameter of the median portion. The sleeve preferably consists of a metallic material, and the sheath of the cable extends through and beyond both end portions of the sleeve. The sealing device further comprises two tubular insulators each of which surrounds and sealingly engages one end portion of the sleeve and the adjacent portion of the sheath, i.e., that portion of the sheath which extends beyond the respective end portion of the sleeve. The maximum outer diameter of each insulator at most equals the maximum outer diameter of the median portion of the sleeve.

The insulators may consist of convoluted tape or foil which is bonded to the adjacent parts, e.g., by injection molding, by vulcanizing or in another suitable way.

The means for sealing the clearance between the median portion of the sleeve and the surface surrounding the hole of the housing may include one or more O-rings which are recessed into the grooves of the surface around the hole and/or into the peripheral surface of the sleeve, or a sealing structure including a tubular bolt which extends into the hole and meshes with the housing, a nut which surrounds the sleeve and meshes with the bolt, and a ring-shaped seal which is deformable in response to rotation of the nut in a direction to receive a larger portion of the bolt whereby the ring-shaped seal sealingly engages the sleeve, the nut and the bolt to prevent leakage of fluid from the interior to the exterior of the housing or in the opposite direction. The device may further comprise one or more stuffing boxes or other suitable means for releasably securing the sleeve to the housing against axial movement.

The novel features which are considered as characteristic of the invention are set forth in particular in the appended claims. The improved sealing device itself, however, both as to its construction and the mode of assembling the same, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary axial sectional view of a sealing device which embodies one form of the invention and includes metallic components which prevent the flow of fluid between the exterior of the sleeve and the surface surrounding the hole in the housing of an electric motor; and FIG. 2 is an axial sectional view of a similar sealing device wherein the means for preventing leakage of fluid between the sleeve and the surface surrounding the hole comprises several elastic O-rings.

DESCRIPTION OF THE PREFERRED EMBODIMENTS

FIG. 1 shows a cable A having a sheath 2 and a conductor 2A. The customary insulating medium between the sheath 2 and conductor 2A is not shown.

An elongated metallic sleeve 1 surrounds that portion of the sheath 2 which extends through a hole 4A in a wall 4 constituting a portion of a motor housing, e.g., a portion of the housing of a submersible pump motor. Both end portions 1A of the sleeve 1 have slightly reduced outer diameters and are surrounded by tubular insulators 3 which establish airtight and liquidtight seals between the exterior of the sheath 2 and the respective ends of the sleeve 1. As shown, each tubular insulator 3 comprises an outer portion 3A which sealingly engages and adheres to the peripheral surface of the sheath 2 and an inner portion 3B which surrounds, sealingly engages and adheres to the respective end portion 1A. The maximum outer diameters of the insulators 3 do not exceed the maximum outer diameter of the central or median portion 1B of the sleeve 1.

The sleeve 1 is held in the hole 4A by a releasable retaining device or sealing means including a hollow tubular bolt 5 having first external threads mating with internal threads of the wall 4 in the hole 4A and second external threads mating with the internal threads of a nut 6. A deformable sealing element 106 is pressed against the peripheral surface of the sleeve 1 and also sealingly engages the bolt 5 and nut 6 when the nut 6 is tightened. This prevents leakage of fluid from the annular space (if any) between the sleeve 1 and bolt 5 on the one hand and the space surrounding the nut 6 on the other hand, or vice versa. The sealing element 106 has a ring-shaped knife edge which engages the part 5 or 6. The sealing action is highly satisfactory because the element 106 has two conical surfaces one of which bears against a complementary conical surface of the bolt 5 and the other of which bears against a complementary conical surface of the nut 6 when the latter is rotated in a direction to receive a larger portion of the bolt 5.

FIG. 2 shows that the clearance between the sleeve 1 and the housing portion 4 can be sealed by several ring-shaped elastic sealing elements 7, e.g., O-rings. To this end, the surface surrounding the hole 4A in the housing portion 4 is formed with annular grooves 8 for the sealing elements 7. If desired, the grooves for the sealing elements 7 can be machined into the peripheral surface of the sleeve 1. Still further, the grooves in the peripheral surface of the sleeve 1 can be provided in addition to the grooves 8.

It is further advisable to provide means for relieving tensional (axial) stresses upon the sleeve 1. FIG. 2 shows by phantom lines the outline of a portion of a stuffing box 9 which is secured to the portion 4 and to the sleeve 1. A similar stuffing box is preferably provided at the other side of the housing portion 4. These stuffing boxes hold the sleeve 1 against axial movement.

It will be noted that the tubular insulators 3 of FIG. 2 are integrally connected to each other by a thin cylindrical portion 103 which is surrounded by the sleeve 1.

The material of the sleeve 1 and that of the tubular insulators 3 will be selected in dependency on the nature of the fluid which fills the interior of the housing and also in dependency on the nature of the fluid present at the outer side of the housing. For example, the sleeve 1 may consist of copper, chromium steel or bronze.

The material of the insulators 3 is further selected with a view to insure tht it can be readily bonded to the surfaces of the adjacent components. For example, and if the sleeve 1 consists of copper, chromium steel or bronze, and the sheaths 2 consist of butyl rubber, polychloroprene, ethylene propylene rubber or the like, the material of the insulators 3 is preferably polvinyl chloride, polyethylene or polyester foil. When the sheaths 2 consist of silicone or fluoroethylene, the sealing elements 3 may consist of polyester foils, bands made of fluorinated ethylene-propylene resin, polytetrafluoroethylene, or the like. Such bands or foils are tightly wound around the adjacent parts. If the material of the bands is vulcanizable, such bands are wound around the end portions of the sleeve 1 and around the sheath 2 and are bonded thereto in response to application of heat. Also, the insulators 3 can be formed by injection molding.

An important advantage of the improved sealing device is that it can be withdrawn from or reinserted into the housing of a motor as often as desired, i.e., it is not necessary to destroy the sleeve 1, the sheath 2, the insulators 3 and or the sealing means (5, 6, 106 or 7) between the sleeve 1 and the housing portion 4 when it becomes necessary to withdraw the sleeve from the hole. Thus, the sleeve 1 of FIG. 1 can be withdrawn as soon as the pressure of the nut 6 upon the deformable element 106 is relaxed, and the sleeve 1 of FIG. 2 can be withdrawn at any time by overcoming friction between the sleeve and the O-rings 7.

Another important advantage of the improved device is that aging of the material of the sheath 2 does not adversely influence the sealing action. The sealing action is furnished by the insulators 3 and by the parts 5, 6, 106 or 7. Since these parts need not be subjected to pneumatic or hydraulic stresses in order to maintain a satisfactory sealing action, the improved device can operate properly when the pressure differential between the interior and the exterior of the housing is high as well as when the differential is small, negligible or zero.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed is:

1. In combination, a wall member having a hole extending therethrough, an electric cable having a sheath extending through said hole, and a sealing device sealing the cable at the hole and comprising, an elongated sleeve surrounding said cable sheath and extending through said hole, said elongated sleeve including a median portion having a first outer diameter and extending through the hole, and two opposite end portions having smaller second outer diameters; means sealing the interface between said median portion of said sleeve and the surface of the wall member which bounds the hole; and a pair of tubular insulating portions, each sealingly surrounding one end portion of said sleeve and the adjacent portion of the cable sheath and each having an outer diameter which is at most equal to said first outer diameter so that either of said insulating portions can pass through the hole and past said sealing means as the sealing device is introduced into and withdrawn from the hole.

2. The combination as defined in claim 1, wherein said sleeve consists of a metallic material.

3. The combination as defined in claim 1, wherein at least one of said insulating portions consists of a convoluted strip-shaped material.

4. The combination as defined in claim 1, wherein at least one of said insulating portions consists of injection molded synthetic plastic material.

5. The combination as defined in claim 1, wherein at least one of said insulating portions is vulcanized onto the respective end portion of said sleeve and the adjacent portion of said sheath.

6. The combination as defined in claim 1, wherein at least one of said insulating portions consists of strip-shaped vulcanizable material which is convoluted onto the respective end portion of the sleeve and onto the adjacent portion of the sheath and is thereupon bonded to such parts by heating.

7. The combination as defined in claim 1, wherein said sealing means includes at least one deformable annular sealing element contacting said median portion of said sleeve and the surface of said wall member surrounding said hole.

8. The combination as defined in claim 7, wherein said median portion has an external surface and at least one of said surfaces has a groove receiving said annular sealing element.

9. The combination as defined in claim 1, wherein said sealing means includes an annular bolt surrounding said median portion of said sleeve and threadedly connected to said wall member, a nut mating with said bolt, and an annular sealing element interposed between and contacting said nut and said sleeve, said element being deformable in response to rotation of said nut relative to said bolt.

10. The combination as defined in claim 1, wherein said sealing means includes means for releasably securing said sleeve to said wall member against axial movement.

* * * * *